Feb. 18, 1930.                    W. S. BELLOWS                    1,747,691
                                   FOLDING TABLE
                          Filed June 21, 1924        5 Sheets-Sheet 1
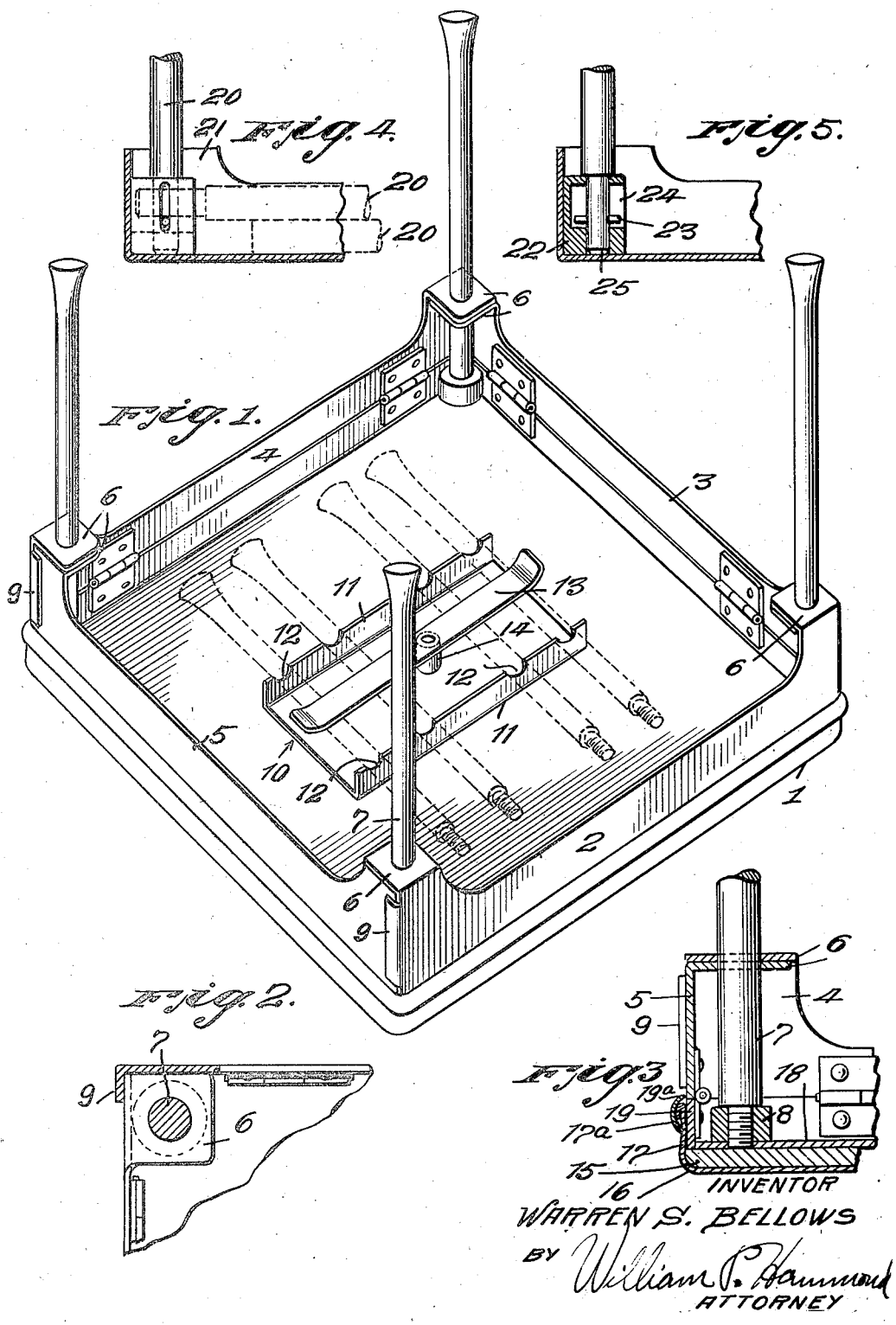

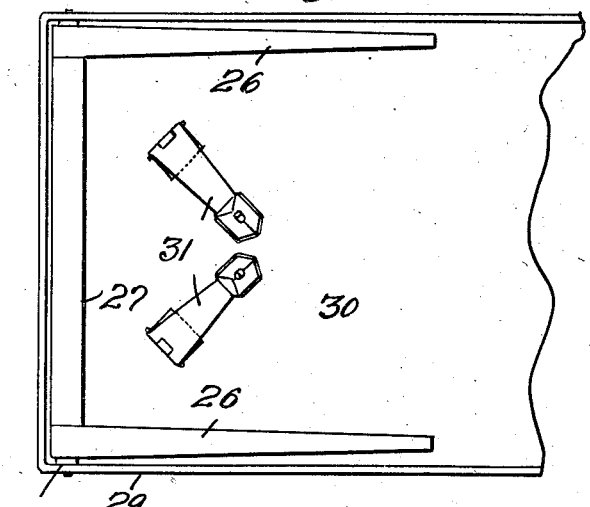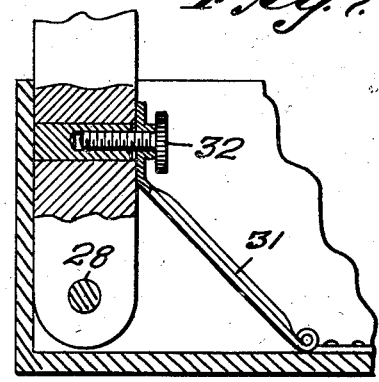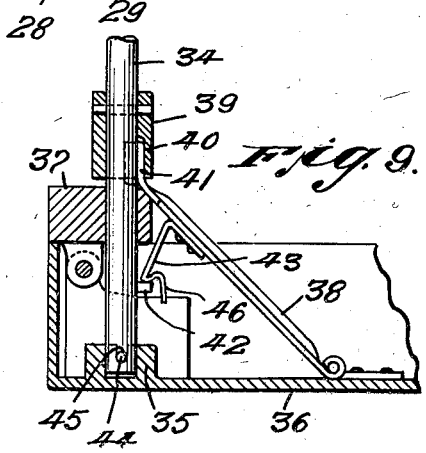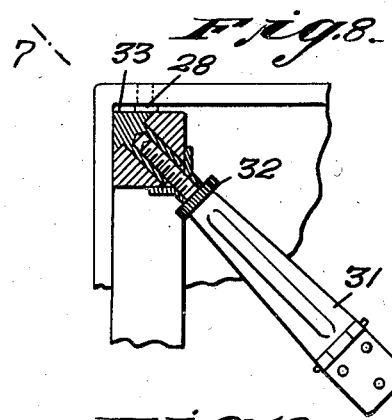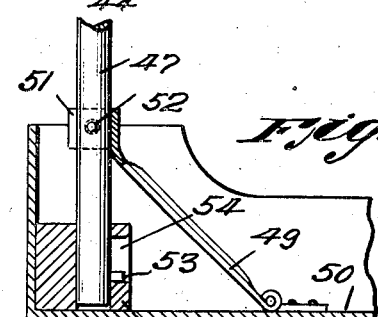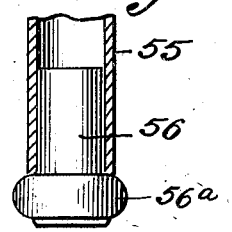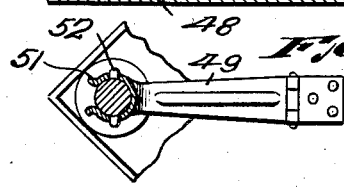

Feb. 18, 1930.   W. S. BELLOWS   1,747,691
FOLDING TABLE
Filed June 21, 1924   5 Sheets-Sheet 3
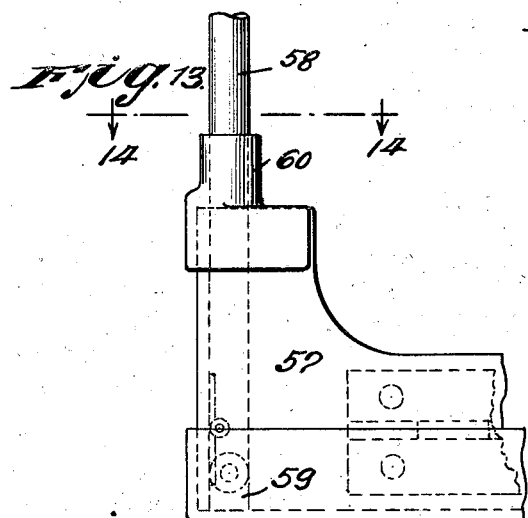
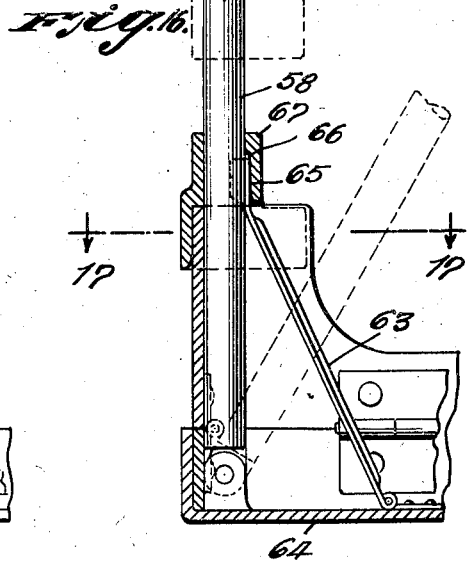
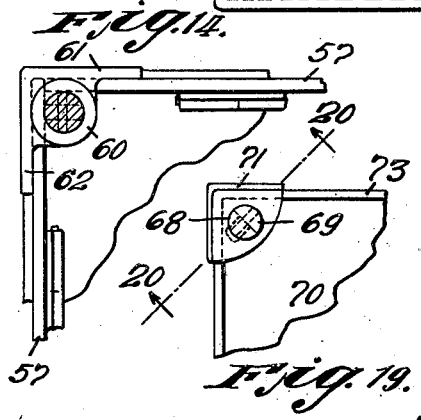
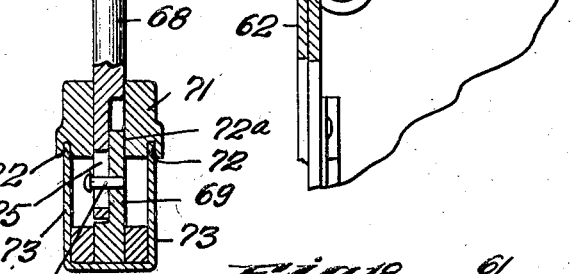
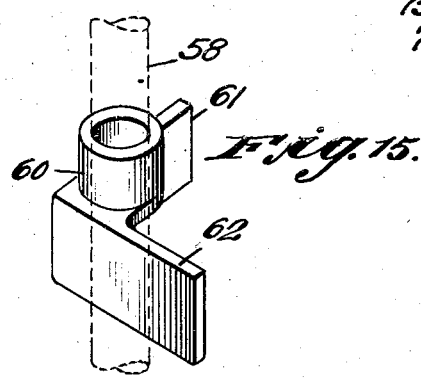
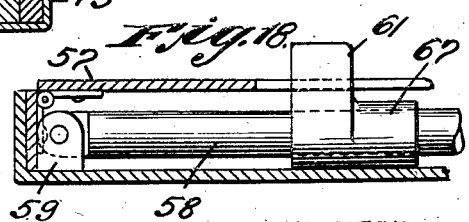
INVENTOR
WARREN S. BELLOWS
BY William P. Hammond
ATTORNEY

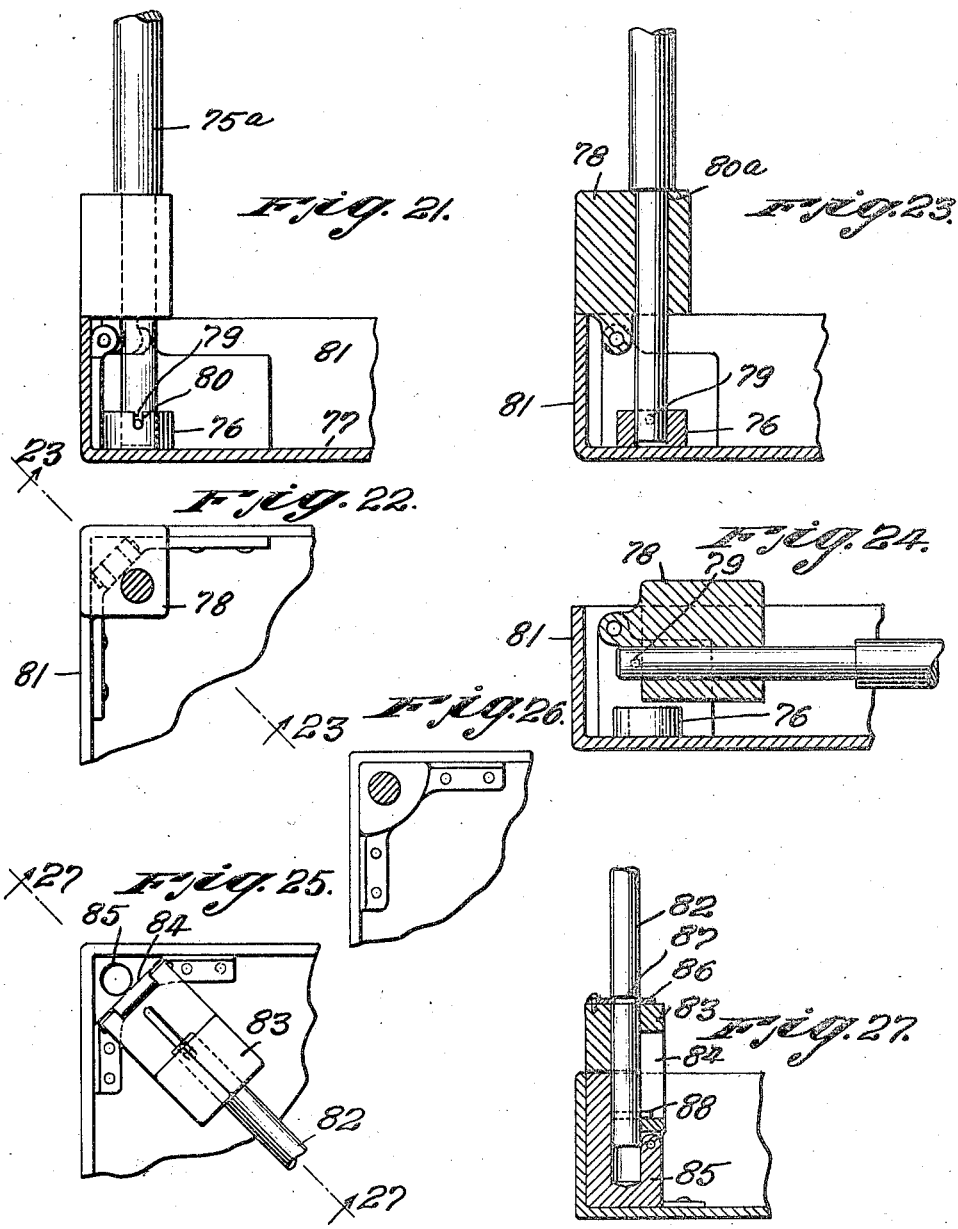

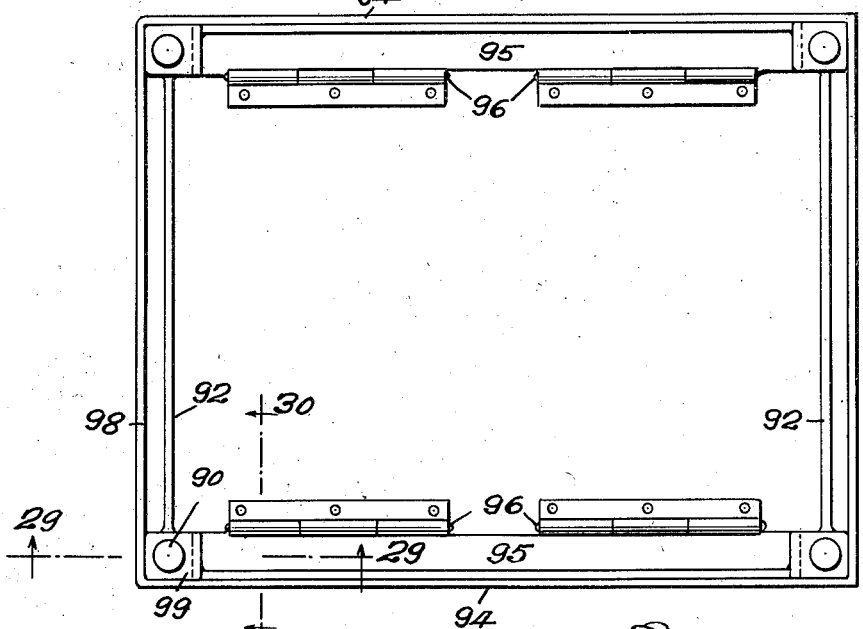
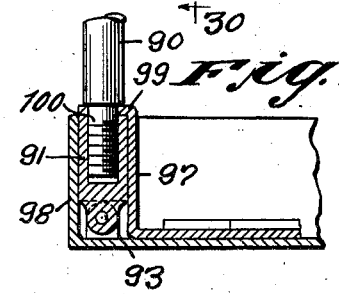
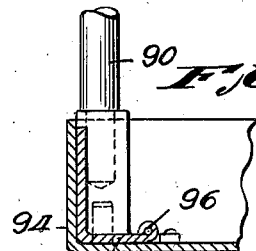
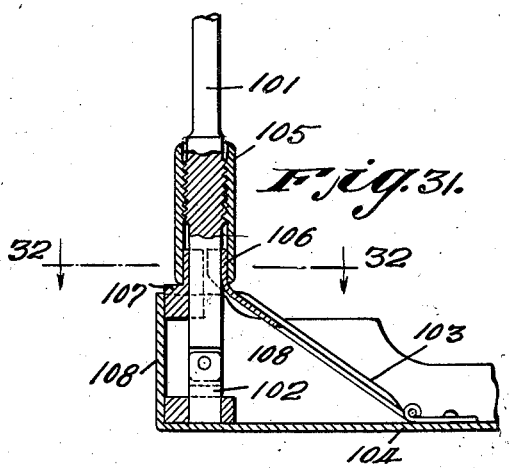
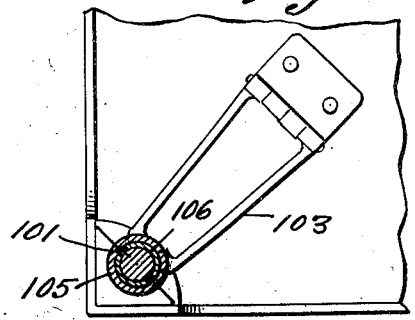

Patented Feb. 18, 1930

1,747,691

UNITED STATES PATENT OFFICE

WARREN S. BELLOWS, OF WORCESTER, MASSACHUSETTS

FOLDING TABLE

Application filed June 21, 1924. Serial No. 721,404.

This invention relates to tables and has for its principal object to provide a table having legs foldable into collapsed relation to the top to provide for compactness in shipping or storing, and releasable means for securely fixing the legs of the table in upright table supporting position when desired.

Certain features are not necessarily limited to tables however, but may be applied to other articles of furniture having legs.

Various other specific objects and advantages will hereinafter appear.

In the drawings:

Figure 1 is a perspective view of an inverted table embodying one form of the invention;

Figure 2 is a horizontal sectional view through one of the corners of the table shown in Figure 1;
Figure 3 is a vertical section through one of the corners of the table illustrated in Figure 1;

Figure 4 is a vertical section showing a corner of a table embodying a different form of the invention;

Figure 5 is a vertical section taken at right angles to the view of Figure 4;

Figure 6 is an inverted plan view illustrating still another form of the invention;
Figures 7 and 8 are vertical and horizontal sections respectively through a corner of the table illustrated in Figure 6;

Figure 9 is a vertical section through a corner of a table embodying still another form of the invention.

Figures 10 and 11 are vertical and horizontal sectional views, respectively, through a corner of a table embodying another form of the invention;
Figure 12 illustrates a means for closing the end of a tubular table leg, which provides a bottom rest for the same;

Figure 13 shows a further form of the invention;

Figure 14 is a horizontal section through a corner of the table illustrated in Figure 13;

Figure 15 is a perspective view of the keeper used in the form illustrated in Figures 13 and 14;
Figures 16 and 17 are vertical and horizontal sections, respectively, showing another form of the invention;

Figure 18 is a vertical section showing the table of Figures 16 and 17 collapsed;
Figures 19 and 20 are horizontal and vertical sectional views, respectively, of another form of the invention;

Figures 21 and 22 are horizontal and vertical sectional views, respectively, of yet another form of the invention;

Figure 23 is a vertical sectional view on the line 23—23 of Figure 22;

Figure 24 is a vertical sectional view similar to Figure 23 but showing the table folded;
Figure 25 is an inverted plan view of a corner of a collapsed table embodying another form of the invention;

Figure 26 is a horizontal section through the corner of the table shown in Figure 25;
Figure 27 is a horizontal section on the line 27—27 of Figure 25;

Figure 28 is a plan view of an inverted collapsed table illustrating another form of the invention;
Figures 29 and 30 are vertical sectional views on the lines 29—29 and 30—30, respectively of Figure 28; and Figures 31 and 32 are vertical and horizontal sectional views, respectively illustrating another form of the invention.

In Figures 1 to 3 the table comprises a top 1 having hinged sides 2, 3, 4 and 5, foldable inwardly. All of the sides have inturned ears 6 for the reception of legs 7 which may be threaded in sockets 8 at the corners of the table top. The legs 7 and the hinged sides are thus caused to brace each other to form a very substantial and rigid construction. The hinged sides 2 and 4, moreover, are provided with lugs or flanges 9 on their ends for bracing the adjacent sides 1 and 3, to form a rigid truss like structure.

Upon the under side of the top there is secured a rack 10 for holding the legs when they are removed from operative position. This rack 10 comprises an angle plate having vertical walls 11 provided with aligned notches 12 in which the legs 7 may lie, and a retaining spring 13 pivoted upon a stud 14 to overlie the legs and hold all of them in their proper notches.

In Figure 3 the details of construction of the top 1 may be seen. The top may comprise a main body 15 of wood or other suitable material, a metal or fabric cover 16 having flanges 17 and a liner 18 having flanges 19 on which the sides 2, 3, 4, 5 are hinged. The edge of the cover 16 may be crimped or folded at 17a and a retaining rim 19a provided for holding the cover in place.

In Figures 4 and 5 the legs 20 are not removable, and the table sides 21 are not foldable. The legs 20 are received in guiding and holding sockets 22 at the corners of the table. Each leg 20 has a pin 23 fixed transversely through it which is movable up and down in a guide slot 24 in the socket 22. When the leg 20 is moved to the position shown in Figure 5 the upper end of the leg is received in the keeper portion 25 of the socket 22 and the leg is retained thereby in upright position. When it is desired to fold up the table, the leg 20 is pulled endwise to draw it out of the keeper portion 25 of the socket 22, the pin 23 meanwhile traveling along the slot 24, and then the leg is folded about the axis of the pin 23 down to the dotted line position shown in Figure 4. It will be understood, of course, that provision is made of a slot at right angles to the slot 24, to permit turning of the leg end. The pin 23 prevents removal of the leg from the socket. As indicated in the dotted line position of Figure 4 the slot 24 is made sufficiently long to permit the legs 20 when in folded position to lie parallel with the table top, one above the other so that the end of one of the legs will not project outward at an angle below the rim of the table.

In Figures 6, 7, and 8 the legs 26 at each end of the table are connected by a cross bar 27 pivoted at 28 in the fixed sides 29 of the top 30 for swinging movement together. Diagonal braces 31 are hinged to the under side of the table top 30 and may be swung up against the legs 26 when the latter are in operative position to support them. Each brace carries a thumb screw 32 which may be turned into a socket member 33 fixed in the cooperative leg 26.

In Figure 9 the legs 34 are received in sockets 35 at the corners of the top 36. The legs 34 at each corner of the table are received slidingly in a pivoted lug 37, and are arranged to be held in operative position by diagonally extending braces 38 that are hinged to the table top 36. Each leg 34 has a sleeve 39 pinned to it, and this sleeve 39 is provided with a recess 40 for receiving the outer end 41 of the cooperative brace 38 to form a keeper therefor. When the brace 38 has been fitted against the leg the leg 34 is moved longitudinally into the socket 35 thereby moving the recess 40 over the end 41 of the brace. The leg is retained in this position by the cooperation of a lug 42 upon the leg with a spring latch 43 on the brace 38. The leg 34 is held against turning in the socket 35 to keep the lug 42 in cooperative relation with the latch 43 by a pin 44 on the leg which fits into a slot 45 formed in the socket. When it is desired to fold the table up, the spring latches 43 are released by pressure upon finger pieces 46 with which they are provided; the legs 34 are moved longitudinally clear of the sockets 35, and the pivoted guide lugs 37 are swung inward with the legs.

In Figures 10 and 11 the legs 47 are longitudinally movable in sockets 48 and are held upright by diagonal braces 49 hinged on the under side of the table top 50. In the position of Figure 10 the leg 47 is held rigidly upright by engagement of its upper end in the upper end of the socket 48, and the leg is held against longitudinal movement by means of a spring yoke 51 on the brace which embraces the leg and has openings in its opposite arms to receive pins 52 projecting from the leg 47. The brace 49 may be withdrawn by springing the arms of the yoke 51 apart, and the leg 47 may then be moved longitudinally to withdraw its upper end from the upper end of the socket 48, and may be turned about the axis of a pin 53 on the leg which travels in a slot 54 of the socket 48 to a position parallel with the table top.

In the form of the invention shown in Figure 12 the leg 55 is hollow and is fitted upon a short shank or plug 56, which may be slightly conical provided with a bottom or support 56a upon which the table may rest upon the floor or the plug 56 may be secured to the table top and the hollow legs attached to the table by driving them upon the conical portion of the plug.

In Figures 13 and 14 the sides 57 of the table are hinged, as in Figures 1 and 2 and the legs 58 are pivoted individually upon lugs 59 at the corners of the table. Each leg 58 has a sleeve 60 slidable upon it which includes an angle bracket having sides 61 and 62. When it is desired to use the table the sides 57 are unfolded to the positions illustrated in Figure 13, the legs 58 are also unfolded, and each sleeve 60 is moved longitudinally of its leg to locate the walls 61 and 62 of the angle bracket outside of the adjacent hinged walls 57 to form a rigid support for the legs and hinged walls 57.

The form of the invention disclosed in Figures 16, 17 and 18 is similar to that of Figures 13 and 14, but includes in addition diagonal braces 63 hinged to the table top 64 for further supporting the legs. Each brace 63 has a spring yoke 65 at its end which embraces the leg 58, and is received in a recess 66 of the sleeve 67 thereon. The sleeve 67 serves as a keeper for the brace 63, and the resiliency of the spring yoke 65, in turn, helps to hold the sleeve 67 in adjusted position. The sleeves 60 and 67 are revoluble on the leg 58 to a position like that shown in Figure 18 to permit the table to be folded.

In Figures 19 and 20, the legs 68 are pivoted on lugs 69 for swinging movement diagonally of the table top 70. A sleeve 71 fast on each leg 68 has channels 72 for receiving the lower edges of the table sides 73 and a hole 72$^a$ to receive the top of the lug 69 to retain the leg 68 in upright position. The leg 68 may be slid longitudinally on its pivot pin 74, by reason of the provision of an elongated slot 75 in the leg 68, and this longitudinal movement of the leg is effective also to withdraw the sleeve 71 from engagement with the sides 73 and lug 69 to permit the leg to be folded down.

In Figures 21 to 24 the legs 75$^a$ are received in sockets 76 at the corners of the table top 77. A sleeve guide 78 hinged to be folded diagonally inward is provided for receiving each leg 75$^a$, to form a brace therefor in the upright position thereof. The leg 75$^a$ carries a pin 79 near its upper end which fits into a slot 80 in the socket to hold the leg against turning. This slot may advantageously be a bayonet slot, to prevent withdrawal of the leg 75$^a$ from the socket 76 without a preliminary turning of the leg. The pin 79 also prevents the withdrawal of the leg 75$^a$ from the guide sleeve 78. In operative position a shoulder 80$^a$ on the leg 75$^a$ bears against the lower surface of the guide sleeve 78, and the sleeve in turn bears against the lower surface of the table sides 81 and helps to support the table. When it is desired to fold the table legs 75$^a$ are withdrawn from the sockets 76 and the guide sleeves 78 are turned down to position the legs flat against the under side of the table top 77.

In Figures 25 to 27 each leg 82 is carried in a sleeve 83 hinged at 84 upon a socket 85 fixed at a corner of the table. The sleeve 83 is tiltable diagonally as indicated at Figure 25 to carry the leg 82 between effective upright position and to folded position. When it is desired to make the leg effective, the sleeve 83 is turned to position the leg 82 upright. The leg is then moved longitudinally of the sleeve to position its upper end in the socket 85, to prevent its being turned away from upright position, and a latch 86, pivoted on the sleeve 83 is then turned to embrace a reduced portion 87 of the leg 83 to prevent longitudinal movement of the leg in the sleeve. This prevents withdrawal of the leg 82 from the socket 85. A pin 88 slidable in a slot 89 of the sleeve 83 prevents separation of the leg 82 from the sleeve.

In Figures 28 and 30 the legs 90 are screwed into sockets 91 which are carried by webs 92 pivoted on ears 93 for movement parallel to the sides 94 of the table. Brackets 95 hinged to the table top at 96 extend from end to end of the table and have vertical end walls 97 which engage and brace the sockets 91 in upright positions. The sockets 91 on their outer faces engage the ends 98 of the table. Each bracket 95 has ears 99 projecting outward from its ends over the sockets 91 to receive reduced ends 100 of the legs 90. The arrangement is such that the axes of the brackets 95 are at right angles to the axes of the sockets 91 and that the brackets completely fill the space between the sockets. The reduced ends 100 of the legs 90 are introduced through the ears 99 on the brackets 95 and are then threaded into the sockets 91. When it is desired to fold the table, the legs 90 are completely unscrewed; the brackets 95 are folded in, the legs are rethreaded into the sockets 91 and the sockets and legs are folded in together.

In Figures 31 and 32 the legs 101 are pivoted upon lugs 102 at the table corners, and are braced in upright position by diagonal braces 103 hinged upon the under side of the table top 104. Each leg 101 has a sleeve 105 threaded upon it, and this sleeve is large enough at its upper end to receive the end 106 of the diagonal brace 103, and the lower end of a spacer 107 positioned in the angle formed by two sides 108 of the table. When the table is in the position of use, as seen in Figure 31 and it is desired to fold it up, the sleeve 105 is first turned sufficiently to clear the end 106 of the brace 103, the brace 103 is then folded in; and the leg 101 is folded in.

Various other modifications may be resorted to within the scope of the invention. The legs of one figure may be combined with the braces of other figures, and parts of the improvements may be used without others without departing from the spirit of the invention or the scope of the appended claims.

I claim:

1. A table comprising a top, fixed sides, legs on the top and means pivotally connecting the legs to the table comprising for each leg a pivotal support including a pivot pin, each leg having a slot therein for receiving the pivot pin, and being rotatable and movable bodily upon said pin, a sleeve fast on the leg and movable with it into interlocking engagement with the sides to hold the leg in upright position.

2. A table comprising a top, sides on the top forming corners, legs longitudinally and pivotally mounted in the corners, sleeves permanently secured on said legs, each comprising a keeper portion in cooperation with said sides at the corners to hold the cooperative leg against swinging movement when the leg is inserted in the corners, and means on each leg to prevent its being separated from the cooperative corner.

In testimony whereof I have affixed my signature to this specification.

WARREN S. BELLOWS.